United States Patent
Szeto et al.

(10) Patent No.: US 6,618,476 B1
(45) Date of Patent: Sep. 9, 2003

(54) LINE INFORMATION SECURITY INTERFACE FOR TAPI SERVICE PROVIDER

(75) Inventors: Steve Szeto, Kanata (CA); Stanley Adam Gores, Ottawa (CA); Stanley Douglass, Kanata (CA)

(73) Assignee: Mitel Corporation (CA)

( * ) Notice: Subject to any disclaimer, the term of this patent is extended or adjusted under 35 U.S.C. 154(b) by 0 days.

(21) Appl. No.: 09/388,712

(22) Filed: Sep. 2, 1999

(30) Foreign Application Priority Data

Sep. 2, 1998 (GB) .............................................. 9819142

(51) Int. Cl.$^7$ ................................................ H04M 3/00
(52) U.S. Cl. ............. 379/198; 379/265.03; 379/265.06; 379/32.01
(58) Field of Search ....................... 379/102.02, 265.09, 379/198, 32.01, 265.03, 265.06

(56) References Cited

U.S. PATENT DOCUMENTS 6,408,064 B1 * 6/2002 Fedorov et al. ........ 379/265.06

FOREIGN PATENT DOCUMENTS

CA   2215863   3/1998

\* cited by examiner

*Primary Examiner*—Ahmad F. Matar
*Assistant Examiner*—Rasha S Al-Aubaidi
(74) *Attorney, Agent, or Firm*—Jones Day

(57) ABSTRACT

A system for providing a secure interface to a PBX system comprising a PBX having a command executor; a plurality of telephony devices connected to the PBX; one or more programmable computing devices connected to the PBX; wherein each programmable computing device has a telephony service provider component which communicates with the PBX command executor through a PBX command interface resident on the programmable computing device to request and obtain a list of telephony device identifiers corresponding to a set of telephony devices which are permitted to be monitored or controlled by the programmable computing device.

12 Claims, 3 Drawing Sheets

LINE INFORMATION SECURITY INTERFACE FOR TAPI SERVICE PROVIDER

FIELD OF THE INVENTION

This invention relates generally to the field of telephony and more specifically to a messaging interface that automatically provides a telephony service provider with detailed information about any selected line device.

BACKGROUND OF THE INVENTION

With the advent of more sophisticated computer technology infrastructures, there has been a movement toward facilitating and implementing telephony functions on desktop computers. On desktop computers, telephony functions are provided by a desktop computer application, which communicates through a telephony line manager interface, which in turn, communicates with a telephony service provider that provides the telephony line. The telephony service provider communicates with the telephony equipment, such as a PBX, to provide the service. One example of a telephony service provider is the Mitel PBX TAPI Service Provider.

A telephony line is a line device with at least one address. POTS, or Plain Ordinary Telephone Sets, have only one address as their primary Directory Number (DN). Digital telephone sets also possess a primary DN; however, they can have other addresses that typically describe line appearances of other sets.

The Telephony Application Programming Interface (TAPI) specification of Microsoft® Windows™ is an example of a telephony line manager interface that provides first party call control to applications on desktop computers. Through a telephony line manager interface, like TAPI, applications can make calls, be notified about calls, answer calls, hold calls, and perform other switch related functions as if the application were the end-point of the call.

Personal computer programs that offer Personal Information Management (PIM) like Microsoft's Outlook, and Lotus Organizer, utilize the functions of a telephony service provider by means of the telephony line manager interface. The telephony service provider passes data through the telephony line manager, whose interface allows an application to present detailed call information on the user's PC. Moreover, the telephony service provider enables the application software to initiate outgoing calls from the user's PC with a simple click of the mouse. Thus, the personal computer application and telephony line manager interface are dependent on the services provided by the telephony service provider.

The telephony service provider can reside on the desktop PC and operate in a stand-alone mode by communicating directly to telephony equipment like a PBX. The stand-alone telephony service provider typically offers a personal computer application control over a single line or device, namely the PC user's desktop telephone set. As an alternative, the telephony service provider can reside on a network-accessed server and provide a client/server mode of operation. The server-based telephony service provider typically controls many line devices on behalf of client computer applications.

Many stand-alone telephony service providers are unable to retrieve the detailed information about the line devices under their control from the telephony equipment they communicate with. In some implementations, the telephony service provider requires the PC user manually configure the details of the devices that it is allowed to control. Amongst the details is the list of Directory Numbers (DNs) that belong to the line device. There is no security to prevent the PC user from entering any DN. In many circumstances, the telephony equipment, such as a PBX, lacks the security to prevent the telephony service provider from controlling any specific line device. This implies that the user can select any telephone line to monitor and control, which poses a potential breach of security.

The issue of security is more acute for stand-alone telephony service providers than it is for server-based telephony service providers. A PC user typically has full administrative control over a stand-alone telephony service provider that resides on his or her own PC. A server-based telephony service provider is generally more secure because access to the server is typically limited to an authorized administrator by password control and possibly physical lock and key. A server administrator has the authorization and level of security to limit what line devices (and hence the list of DNs) a client application program can monitor and control.

Because the server-based telephony service provider has access to many line devices (telephone sets), an administrator is still required to manually configure the list of devices that each client computer is allowed to monitor and control. Aside from the requirement of manually configuring the primary DN that identifies each line device, the administrator may have the added burden of configuring all the detailed information for each line device. Additional Directory Numbers that represent addresses (or line appearances) would be amongst this additional detailed information required against each line device.

SUMMARY OF THE INVENTION

A mechanism is needed for a telephony service provider to acquire detailed information about a line device it can monitor and control from the telephony equipment. Such information provided to the telephony service provider should include a the list of Directory Numbers (DNs) supported by a line device, and optionally, other ancillary information. The telephony service provider should also be able to provide this information to a requesting application utilizing the services of the telephony service provider.

For a stand-alone telephony service provider controlling a PC user's desktop telephone, this offers two benefits. First, it removes the PC user from the burden of configuring his telephony service provider with the details of his telephone set. And second, it improves security by limiting a PC user's control to only his line device (or telephone set). There are also benefits a server-based telephony service provider controlling many line devices on behalf of client computers. Although a server administrator may still be required to configure the server-based telephony service provider with the list of line devices for each client computer, he does not have to configure the detailed information that describes each line device.

Telephony equipment, such as a PBX, typically holds a database with the detailed information about each line device. The telephony equipment uniquely distinguishes one line device (or telephone) from another by means of an identifier. Access to a line device's information can be made by means the unique identifier. The hardware connection that links a stand-alone telephony service provider with the telephony equipment, such as a PBX, may be used as the unique identifier to uniquely identify the line device to be controlled. In a preferred embodiment, it is the hardware connection between the telephony equipment and the telephone set, to which the stand-alone telephony service provider is physically connected to, that is used for this unique identification. The unique identifier used to retrieve the detailed information about the line devices, such as a telephone set, on behalf of the telephony service provider. The list of DNs the telephony service provider is permitted to support is an example of the detailed information that can be provided to to the telephony service provider, and passed on to the application.

The hardware connection between the telephony equipment and a telephony service provider offers access to a plurality of line devices. The unique identifiers, that distinguish line devices on the telephony equipment, are stored in a database for access by the telephony service provider. A user, such as an administrator of the telephony equipment, or of a server based telephony service provider, configures these unique identifiers to define the collection of line devices to be associated with client computers. The telephony service provider uses these unique identifiers to acquire the detailed information of each line device from the telephony equipment, such as a PBX. The retrieved information determines which DNs (addresses or line appearances) a particular line device is permitted to monitor and control.

However, the present invention is not limited to retrieving line appearance information. The present invention could be used to retrieve other information based upon identifiers such as IP addresses, MAC addresses, trunk ids, or any other identifier used to identify devices in the environment.

Therefore, according to one aspect of the present invention, there is a system for providing a secure interface to telephony equipment, such as a PBX system, comprising:

(a) A PBX having a command executor;

(b) A plurality of telephony devices connected to the PBX;

(c) One or more programmable computing devices connected to the PBX;

wherein each programmable computing device has a telephony service provider component which communicates with the PBX command executor through a PBX command interface resident on the programmable computing device, to request and obtain detailed information corresponding to a set of the telephony devices which are permitted to be monitored or controlled by the programmable computing device.

Furthermore, according to another aspect of the present invention, there is provided a method for providing a secure interface to a PBX system comprising:

(a) sending a request for monitorable line appearances from a telephony service provider of a programmable computing device to a PBX;

(b) the PBX sending a list of monitorable line appearances in response to the request to the programmable computing device.

BRIEF DESCRIPTION OF THE DRAWINGS

A detailed description of the preferred embodiments is provided herein below, with reference to the following drawings in which.

DESCRIPTION OF THE PREFERRED EMBODIMENT

Figure 1:
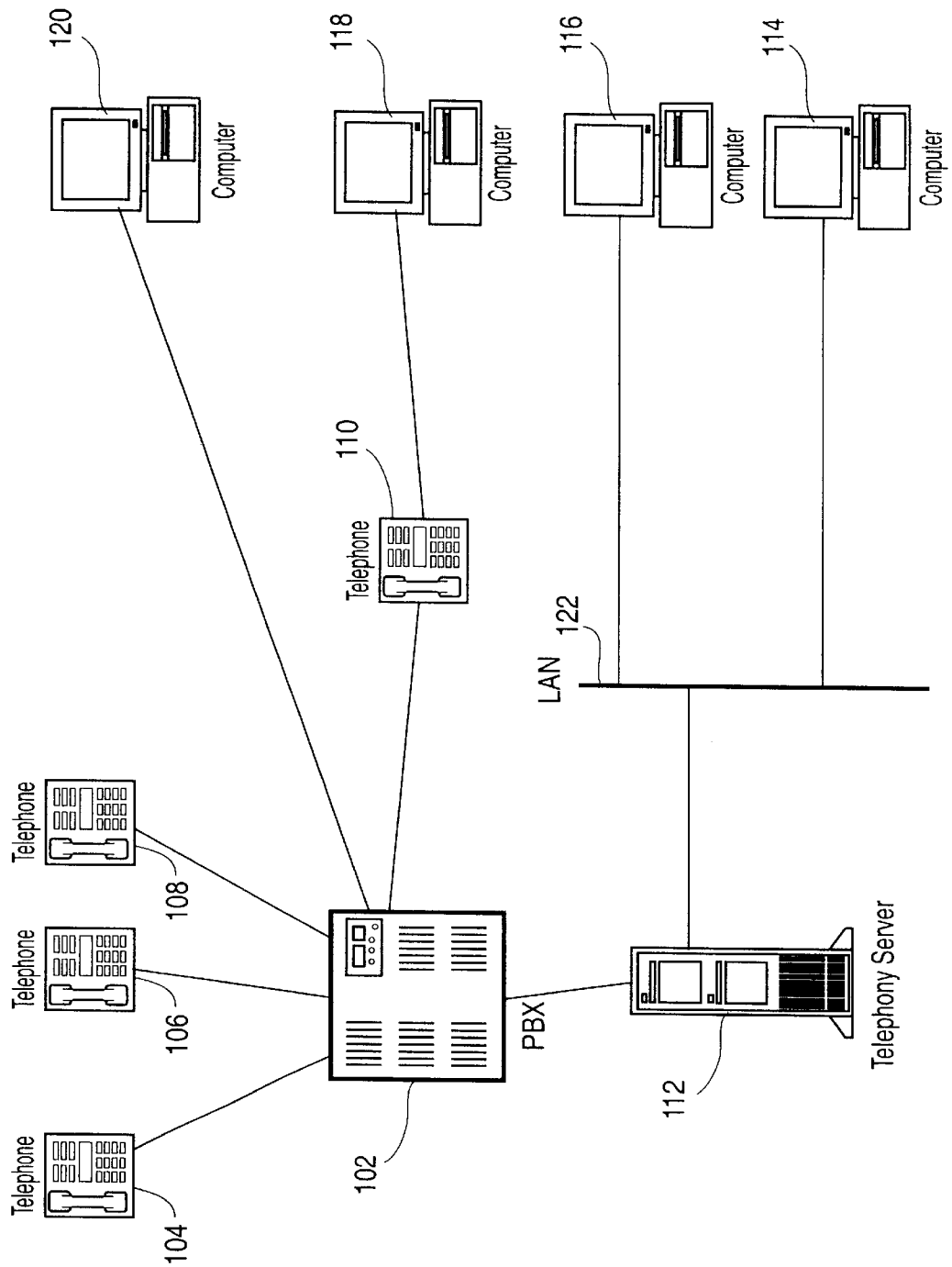
FIG. 1 is a representative block diagram illustrating the telephony environment of the present invention.

Turning to FIG. 1, a traditional PBX system 102, as is well known in the art, is illustrated. PBX system 102 may be connected to numerous other devices and servers such as a digital service units, network gateways, application gateways, network management servers, voice mail servers, call management servers, call accounting servers and public telephone systems (not illustrated). A person of ordinary skill in the industry will appreciate that numerous other configurations are possible. The PBX system 102 incorporates physical hardware and core PBX software implementing well known PBX call control functions. The hardware components of PBX system 102 typically include a main controller and a plurality of fiber interface modules (FIM) which plug into a back plane of the PBX system 102 for multiplexing voice and signaling channels over fiber links to peripheral cabinets and devices (not shown). The main controller of PBX system 102 typically includes a central processor, memory including disk memory and a disk controller, an Ethernet LAN interface providing access to corporate local area networks, a back plane interconnecting peripheral devices, various switching and signaling components, and communications ports to connect to telephony devices. The PBX system 102 also provides line card interfaces, for connecting analog telephone sets 104 and 106, digital network interface circuits (DNIC), for connecting digital telephone sets 108 and 110, as well as trunk card interfaces, for connecting to the outside public switch telephone network (PSTN). An SX2000 PBX by Mitel® is a typical example of PBX system 102.

The PBX system 102 is programmed by a customer data entry interface coupled to the PBX system 102, and contains a database for maintaining information in structured records, and file system for file storage and retrieval. Software components executed within PBX system 102 include call control, management of call features, a message switch subsystem providing communication with intelligent nodes, a circuit switch subsystem providing voice channels to the switch matrix, a command executor passing commands according to a command language, and maintenance software that monitors and tests components in the PBX system 102.

A telephony server 112 may be connected to PBX system 102 via fiber connection and utilizing a host command interface to pass information to and from the PBX system 102 as required. Telephony server 112 is a server-based telephony service provider that supports computer telephony interfaces such as TAPI in order to permit third party application developers to monitor and control PBX functions within the PBX system 102 by connecting as a client to the telephony server 112. Telephony server 112 such as is well known in the art may be connected to a local area network 122 using well known networking protocols such as Ethernet. Programmable computing devices such as personal computers 114, 116, 118 and 120, may be standard personal computers well known in the art running standard operating systems such as Windows 95 or 98 by Microsoft. Personal computers 114, 116, 118 and 120 contain various desktop computer applications including applications which perform telephony functions that communicate through a telephony line manager interface which in turn communicates with a telephony service provider running either on the computer itself or on the telephony server 112 that provides telephony functions.

Call signal control is provided to applications on desktop computers 114, 116, 118 and 120 through a telephony line manager interface, such as TAPI. Using a telephony line manager interface, like TAPI, applications can make calls, be notified about calls, answer calls, hold calls and perform other switch related functions as if the application were the end point of a call. Using a telephony line manager interface, like TAPI, an application can access multiple telephone lines, with one or more addresses associated with each line. An address can be referred to as directory number (DN). Each line has an address and each address can have one or more calls associated with it and each line may monitor or control one or more other addresses simultaneously. Personal computers 114 and 116 are connected to a local area network 122 using standard networking interfaces such as Ethernet to communicate with telephony server 112. Telephony server 112 can then filter, format, receive and serve telephony functions to personal computers 114 and 116 through its interface to PBX system 102 and local area network 122. Personal computer 118 may be connected to digital telephone 110 through a communications line or port such as a RS232 or USB interface. Digital telephone 110 then connects to PBX system 102 using a standard digital telephone line. Personal computer 120 may be directly connected to PBX system 102 using a standard analog or digital telephone line. Telephony applications on personal computers 114 and 116 send and receive messages to PBX system 102 through a messaging interface to through local area network 122 utilizing the services of telephony server 112. The messaging interface is further illustrated with respect to FIG. 2. Alternatively, personal computer 118 sends and receives messages to PBX system 102 using the messaging interface through telephone 110. Alternatively, personal computer 120 sends and receives .messages from PBX system 102 using the messaging interface through a direct connection to PBX system 102. The messaging interface allows personal computers 114, 116, 118, 120 or any other appropriately configured electronic computer device adapted to utilize the messaging interface to send and retrieve control and monitoring information regarding any telephony device such as analog telephones 104, 106 or digital telephones 108, 110 or any other telephony device connected to PBX system 102.

Figure 2:
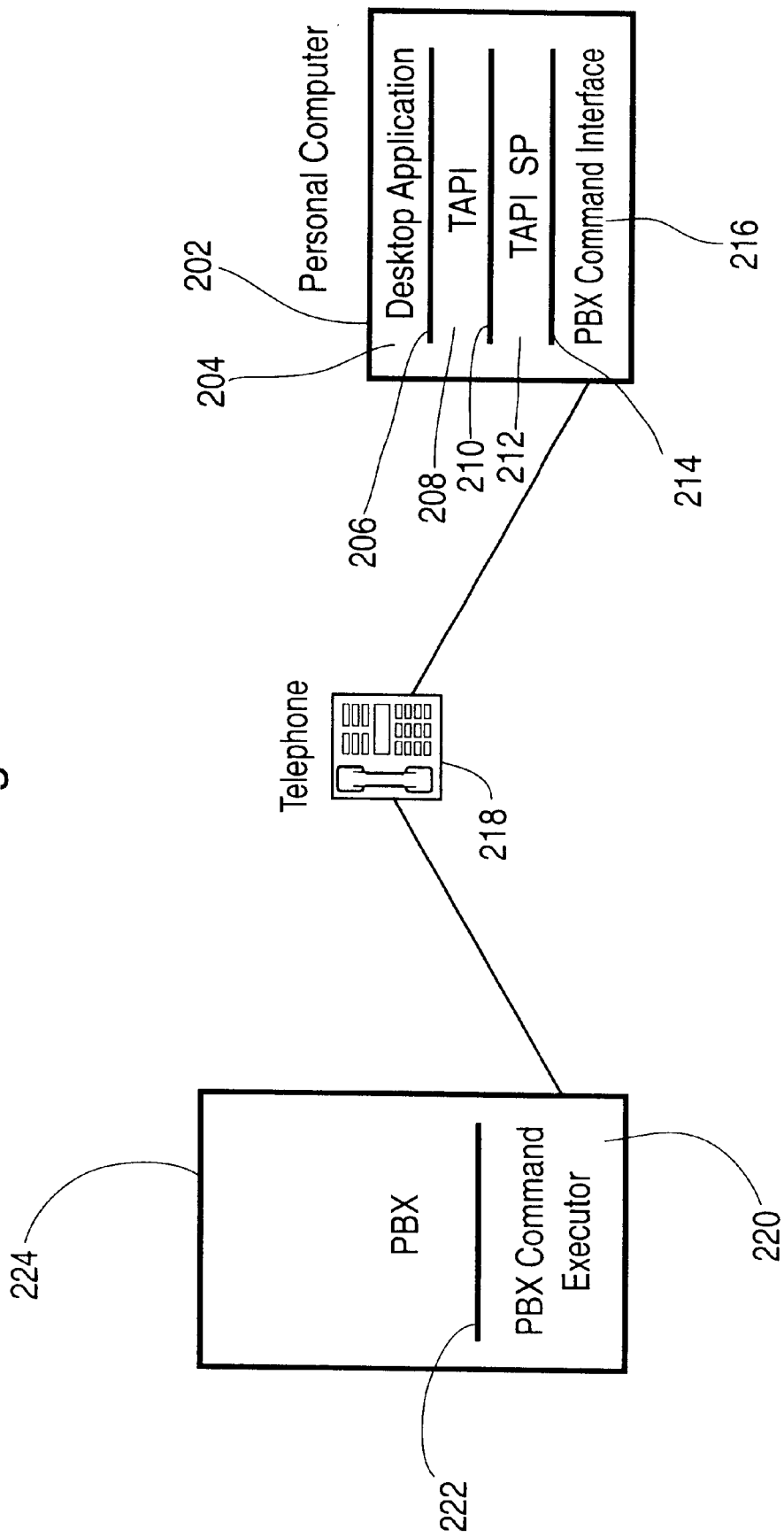
FIG. 2 is a representative block diagram illustrating a preferred embodiment of the messaging interface using the environment of FIG. 1.

Turning to FIG. 2, the typical messaging interface between a personal computer, to a PBX system of FIG. 1 is further illustrated. In the example of FIG. 2, the messaging interface is provided through a digital telephony. Personal computer 202 has running within it one or more desktop applications 204 that provide telephony functions. Desktop application 204 communicates to a telephony line manager such as TAPI 208 through interface 206. TAPI 208 communicates with the telephony service provider such as TAPI SP 212 through interface 210. TAPI SP 212 communicates to the PBX command interface 216 through interface 214. The PBX command interface sends and receives commands from the PBX command executor 220 of PBX system 224 via connections through digital telephone 218. PBX command executor 220 communicates with the hardware and software of PBX system 224 through interface 222.

The applications and interface 204 to 216 in personal computer 202 would operate in a similar manner on each of the personal computers 114 to 120 of FIG. 1 in a manner readily apparent to one skilled in the art. Although personal computer 202 is connected to the PBX system 224 through a communications interface such as RS232 or USB on a standard digital telephone set, personal computer 202 could be connected to PBX system 224 in any manner such as well known in the art including those illustrated in FIG. 1.

In a preferred embodiment, the PBX system 224 is a Mitel SX2000. In the preferred embodiment, the command executor 220 and PBX command interface 216 use a command language such as q2000 by Mitel to support the connection of telephony service providers (TAPI SP 212) to the PBX system 224. The command language provides sufficient information to monitor and control calls in the PBX system 224. As an alternative, a PC may be connected to PBX system 224 through a link to an applications gateway or a communications card and digital telephone dataset. The use of a command language such as q2000 permits commands and messages to be sent from the personal computer 202 through the telephone 218 to the PBX system 224 using the telephone line connection. In the preferred embodiment, the personal computer 202 is connected to a 4000-series Mitel telephone 218 which acts as a intermediary between the PC and the PBX system 224. A direct connection between the personal computer 202 and the PBX system 224 could alternately be provided.

In order to send functional information between the PBX system 224 and the personal computer, the MINET protocol is used as the network layer protocol, although other protocols could be used.

Figure 3:
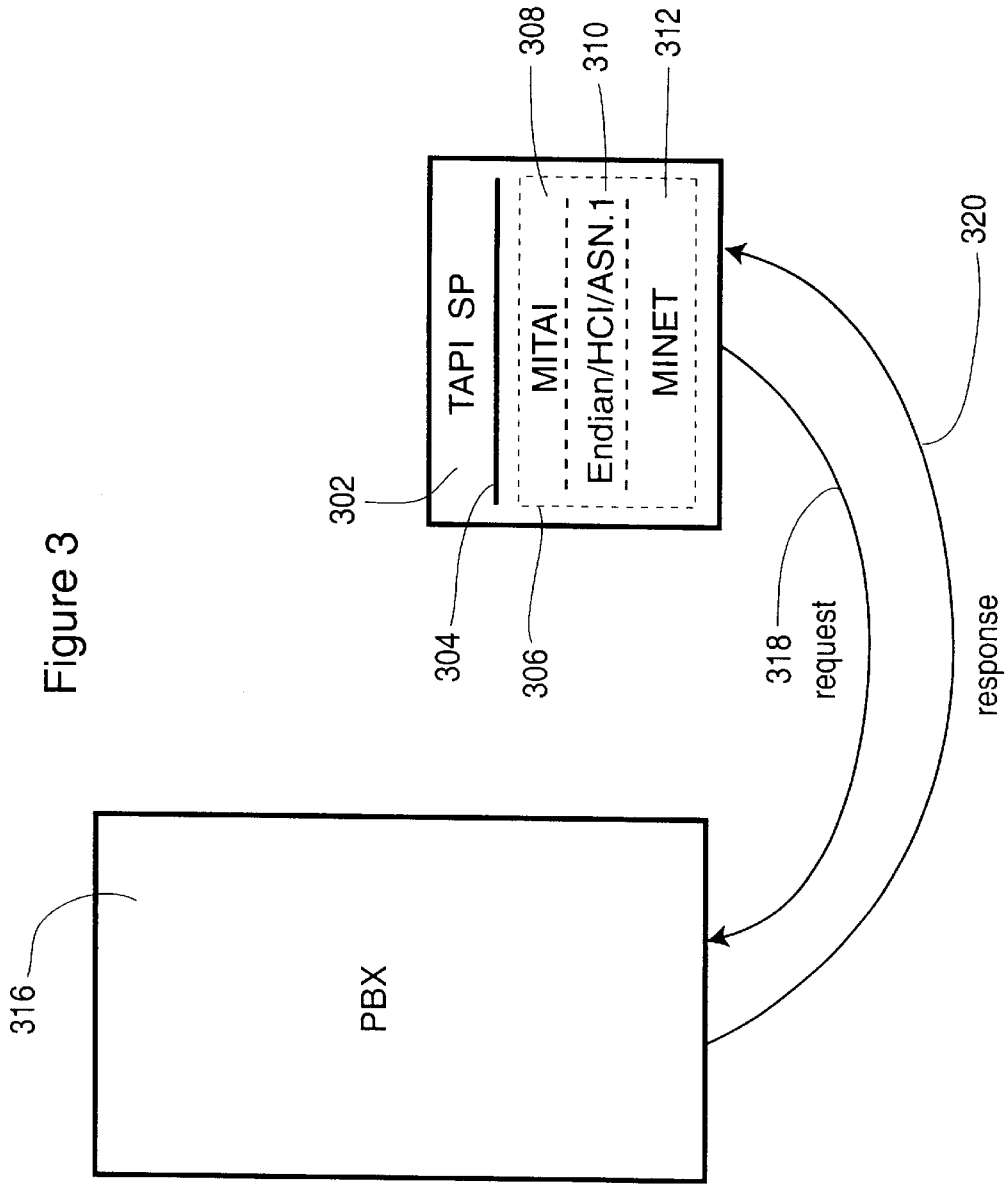
FIG. 3 is a representative block diagram illustrating the telephony service provider interface with the PBX command interface of FIG. 2.

Turning to FIG. 3, the TAPI SP interface with the PBX command interface of FIG. 2 is further illustrated. TAPI SP 302 communicates to PBX command interface 306 through interface 304. PBX command interface 306 contains the necessary facilities to provide communications to the PBX. In the example of FIG. 3, the PBX command interface 306 provides communications with a Mitel SX2000 PBX and contains a MiTAI layer 308, an endian/hci/asn.1 layer 310 and a MINET layer 312 for communication with the PBX. MITAI can be implemented as a client/server layer that provides routines and data retrieval macros for the TAPI SP 302.

In the preferred embodiment illustrated, the size of Q2000 messages could be reduced in size using standard compression algorithms to be passed between the PC and the PBX.

The following illustrates one example of how requests and responses can be passed from the personal computer application and the PBX system 316.

The desktop application communicates with the TAPI SP 302 via TAPI to obtain information from the PBX 316 and to control PBX resources. The TAPI SP 302 receives TAPI requests from the desktop application and interfaces with the MiTAI 308 server process to process the TAPI requests. The TAPI SP 302 initiates a request for the PBX 316 to MITAI 308. In the preferred embodiment, the TAPI SP 302 is a MITAI client running in the same Windows or Windows 95 environment as the MITAI 308 server process. The MITAI 308 server process generates an ASN.1 formatted HCI message which, when passed to the HCI/endian/ASN.1 310 layer, is converted to a q2000 message. When different processors are running in the personal computer and the PBX system 316, the q2000 messages to be sent and received by the personal computer must be Endian converted due to the different manner in which each processor manages instructions and data formats (Motorola vs Intel).

The Q2000 messages are then placed into MINET Datagrams (MINET encapsulation) before sending the data to the PBX system 316. MINET Datagrams act as the Layer 3 (network layer) protocol mechanism. This permits the requests and responses to be passed through a telephone line as necessary to the PBX system 316.

To provide a secure service to the personal computer application, each telephony service provider (TAPI SP 302) needs to know about all the programmed DNs or line appearances on the associated telephone or device. This is preferably done at TAPI SP initialization. This information is required so that the TAPI SP 302 can establish a monitor on each line appearance without the need for having the user manually enter the number of each line appearance through the existing TAPI programming interface provided by Microsoft.

Line appearance information gathering is triggered by the personal computer TAPI application sending a TSPI_lineGetDevCaps to the TAPI SP 302. The TAPI SP 302 then issues a request to the PBX command interface 306 who, in turn, sends a translate_All_Monitorable_Lines request to the PBX software. The request contains the id of the sending line used by the personal computer connection. The PBX system 316, upon receipt of the request 318, sends back a response 320 of a list of line appearances which the sending line is addressed to monitor or control.

The following illustrates how the line appearance gathering activity would work in a Mitel environment using a Mitel SX2000, MiTAI, MINET and the q2000 language.

A new translate command is used to allow the TAPI SP 302 to request translate information on all line appearances of a given set. A new q2000 translate code, such as q2000_fc_translate_all_monitorable_lines, would be received and processed by the command executor (Q2000) software on the PBX system. The Endian/HCI/ASN.1 layer 310 would perform a translation request using the following data structure:

```
Translate OPERATION
   ARGUMENTSEQUENCE
   addressing    Addressing-info,
   trans-type    ld_all_monitorable_lines Directory-number
```

The Directory-number parameter can be a null string. It is expected that a stand-alone TAPI SP will set this field to a null string, but a TAPI SP on a telephony server will send a non-nil directory number. Upon receipt of a q2000_fc_translate_all_monitorable_lines request 318 with a null directory number, the PBX will automatically provide translate information on the line device connected to the TAPI SP. For a stand-alone TAPI SP, the PBX system 316 uses the unique identifier for the hardware line to determine which translate information to provide.

In an alternate embodiment, the optional Directory-number field is designed for a telephony application server like Mitel's Applications Gateway which has no associated directory number, device or telephone set. Programs running on a telephony application server can also use this new translate feature to obtain translate information for all line appearances on any programmed DN or line on the PBX.

If the PBX is unable to provide translate information, a q2000_err_invalid_parameter_value will be returned. The corresponding Endian/HCI/ASN.1 layer 310 return code is INVALID_TRANS_VALUE_C. An example of when this error code is returned is when an Applications Gateway sends a Translate All Monitorable Lines request to the PBX with an invalid or unprogrammed Directory Number. If an Applications Gateway sends a Translate All Monitorable Lines request with a null string, a q2000_err_unsupported_target error will be returned.

The PBX will send a single translate response 320 result containing, for example, the button number and extension of each monitorable line appearance for the telephone line or DN. The first extension in the list will be that of the prime extension or DN making the request.

For example, the Translate result to the PBX command interface 216 could be defined with a data structure as follows:

```
Translate    OPERATION
                RESULT SEQUENCE
                addressing        Addressing-info,
                desc              Logical-descriptor
Logical-descriptor
     lid          Logical-equipment-id
     info         Logical-device-info
```

If no Directory-number is specified in the request 318 to the PBX, then the lid in the response message 320 will be the logical equipment id of the line or DN connected to the TAPI desktop application personal computer. If the optional Directory-number field is specified, then the lid will be that of the device associated with the Directory-number.

In this example, the information in the response 320 returned to the desktop computer is defined as follows:

```
monitorable_lines_info
     number_of_monitorable_lines    byte
     line1                          optional_line_data
     line2                          optional_line_data
     ...
     line16                         optional_line_data
```

In this example, 16 different line appearances can be described in the monitorable_lines_info data structure.

The first line appearance in the data (line 1) will always be the prime line of the phone or device connected to the requesting stand-alone TAPI SP. Each optional_line_data entry will contain the following information:

```
lid                  logical_equipment_id
extension_number     Directory_number
```

If the application wishes more information regarding a particular monitorable extension, then an additional information request must be sent to the PBX. It is expected that the application will send a request 318 to the PBX with the prime number of the set to obtain name information and device type information.

An example of a translate-all-monitorable-lines result implemented in a Mitel environment is as follows:

```
                Operation = Translate
A2 49 30 47
02 01
04              InvokeId ... Integer(4)
30 42           Result ... Sequence
7E 06           Addressing ... Addressing
53 01           DataLost Null(Absent)
00              InvokeAddr ... Address(0)
```

-continued

| | Operation = Translate |
|---|---|
| 53 01 00 | ServerAddr . . . Address(O) |
| | SequenceNum Word(ABSENT) |
| 66 38 | |
| 54 04 7D 00 00 0D | Lid . . . Lid(2097152013) |
| BI 30 | Info . . . LogicalDevInfo |
| |   MonitorableLineData . . . MonitorableLineDataInfo |
| 50 01 03 |     NumberofMonitorableLinesByte(3) |
| 7F 2D 0C |     line1 . . . MonitorableLineData |
| 54 04 7D 00 00 0D |       Lid . . . Lid(2097152013) |
| 55 04 31 32 |       ExtensionNumber . . . DirectoryNumber: 1222 |
| 7F 2D 0C |     line2 . . . MonitorableLineData |
| 54 04 7D 01 00 0D |       Lid . . . Lid(2097217549) |
| 55 04 31 32 32 34 |       ExtensionNumber . . . DirectoryNumber: 1224 |
| 7F 2D 0C |     line3 . . . MonitorableLineData |
| 54 04 7D 04 00 0D |       Lid . . . Lid(2097414157) |
| 55 04 35 35 35 35 |       ExtensionNumber . . . DirectoryNumber: 5555 |
| |     line4 MonitorableLineData(ABSENT) |
| |     line5 MonitorableLineData(ABSENT) |
| |     line6 MonitorableLineData(ABSENT) |
| |     line7 MonitorableLineData(ABSENT) |
| |     line8 MonitorableLineData(ABSENT) |
| |     line9 MonitorableLineData(ABSENT) |
| |     line10 MonitorableLineData(ABSENT) |
| |     line11 MonitorableLineData(ABSENT) |
| |     line12 MonitorableLineData(ABSENT) |
| |     line13 MonitorableLineData(ABSENT) |
| |     line14 MonitorableLineData(ABSENT) |
| |     line15 MonitorableLineData(ABSENT) |
| |     line16 MonitorableLineData(ABSENT) |

In an alternative embodiment, the present invention could be used to simplify the existing initialization sequence for the server-based TAPI SP. Today, an administrator must enter all DNs that each user can monitor and control, including each prime DN and each line appearance DN. This could be simplified such that the administrator need only enter the prime DN that each user can monitor and control. The TAPI SP can then send a request to the PBX and receive a response of a list of line appearances programmed on each phone. Each user would be allowed to monitor and control any or all of the appearances on the phone.

The preferred embodiment of this invention uses the id of the line or DN as the key identifier (prime line or DN) for each TAPI SP connection. In an alternate embodiment, the telephone can be replaced with any other unique piece of hardware including a dataset, a modem, or a piece of proprietary hardware (like Mitel's Talk-to card which emulates a telephone) that has its own unique identifier. Any piece of hardware that can be programmed on the PBX as a unique device and can support a connection to a PC (via RS-232, USB, TCP/IP, ethernet, ATM, frame relay, or any other well defined computer interface) can be used with this invention. Such hardware could be identified by IP address, MAC addresses, trunk id or any other suitable computer or telephony identifer, and suitable information about such hardware could be returned in the response 320 from the PBX system.

Although the invention has been described in terms of the preferred and several alternate embodiments described herein, those skilled in the art will appreciate other embodiments and modifications which can be made without departing from the spirit and scope of the teachings of the invention. All such modifications are intended to be included with the scope of the claims appended hereto.

What is claimed is:

1. A system for providing a secure interface to a PBX system comprising:

(a) a PBX having a command executor;

(b) a plurality of telephony devices connected to said PBX;

(c) one or more programmable computing devices connected to said PBX, each of said one or more programmable computing devices having in respect of said PBX a unique identifier;

wherein each said programmable computing device has a telephony service provider component which communicates with said PBX command executor through a PBX command interface resident on said programmable computing device to request and obtain a list associated with its unique identifier of telephony device identifiers corresponding to a set of said telephony devices which are permitted to be monitored or controlled by said programmable computing device.

2. The system of claim 1 where said telephony device identifiers comprises line appearances.

3. The system of claim 1 where said telephony device identifiers comprises IP addresses, MAC addresses, trunk identifiers and computer identifiers.

4. The system of claim 1 wherein said programmable computing device is connected to said PBX through one of said telephony devices.

5. The system of claim 1 wherein said programmable computing device is a personal computer.

6. The system of claim 1 wherein said programmable computing device monitors and controls said telephony devices indicated on said list.

7. The system of claim 1 wherein said programmable computing device is a telephony server.

8. A method for providing a secure interface to a PBX system comprising:

(a) sending a request for monitorable line appearances from a telephony service provider of a programmable computing device to a PBX, said programmable computing device having a unique identifier in respect of said PBX;

(b) said PBX determining said unique identifier of said programmable computing device upon receipt of said request;

(c) said PBX sending a list to said programmable computing device of monitorable line appearances associated with said unique identifier in response to said request.

9. The method of claim 8 wherein said request and response are sent through a PBX command interface resident on said programmable computing device for translation to and from PBX command language format respectively.

10. The method of claim 8 wherein said request is received, processed and said response provided by a command executor resident on said PBX.

11. The method of claim 8 wherein said programmable computing device is a personal computer.

12. The system of claim 8 wherein said programmable computing device is a telephony server.

* * * * *